Patented Feb. 25, 1941

2,233,090

UNITED STATES PATENT OFFICE 2,233,090

ADHESIVE-COATED SHEET MATERIAL

Benjamin Asnes and Ernest L. Kallander, Framingham, Mass., assignors to Dennison Manufacturing Company, Framingham, Mass., a corporation of Massachusetts No Drawing. Application January 24, 1939, Serial No. 252,680

5 Claims. (Cl. 260—757)

This invention relates to adhesive-coated sheet material of the type adapted to be activated to adhesiveness either by the application of heat or by the application of a suitable solvent. It applies to such articles of commerce as labels, sealing tape, papers for packaging purposes, and papers designed to be applied to various surfaces for purposes of protection and identification. Heretofore such compositions as have been available have suffered from the disadvantages of being either too slow in adhesive activation or requiring too high temperature or have been unduly affected by the temperature of warm climates in storage, resulting in blocking or sticking together of adjacent sheets in a bundle.

Adhesive coated sheet material of the aforesaid type made in accordance with prior practices have sometimes been made of paraffin-rubber mixtures. We propose to discuss such mixtures since they are more closely related to applicants' invention and will therefore serve as a point of reference. If the composition is for use in cases where a wide range of adhesion and resistance to blocking are of primary importance, it is the usual practice to increase the proportion of paraffin to an extent sufficient to obtain these characteristics, even though in so doing the adhesive strength is materially impaired; on the other hand where strong adhesion is the important consideration the proportion of rubber is increased so as to produce the desired result, notwithstanding that the resulting composition may have a relatively low range of adhesion and poor blocking quality. For use intermediate these extremes the proportion of paraffin and rubber are varied to effect a compromise reasonably satisfactory for the general requirements of the trade.

The principal objects of the present invention are to overcome the aforesaid disadvantages and to provide an improved adhesive of the aforesaid type which, when applied to sheet material, produces a uniform colorless coating having good blocking characteristics and, when activated to adhesiveness either by the application of heat or by the application of a suitable solvent, possesses quick tack, a wide range of adhesion and a better all-round balance of properties. Further objects relate to various advantageous characteristics of our improved composition which will be apparent from a consideration of the following description wherein we have disclosed different examples of compositions prepared in accordance with the present invention.

We have discovered that aqueous dispersions and non-aqueous emulsions of wax and rubber or rubber-like materials may be compounded with vinyl resins to produce a composition which satisfies the aforementioned objectives, and that when a vinyl resin is compounded with wax-rubber mixture it not only imparts strength, firmness, true elasticity and resistance to deformation, but also increases the thermo-plasticity of the composition without detracting from its adhesiveness and quick tack. We have also observed that certain of the desirable characteristics of the rubber, i. e., its inherent pliability and adhesiveness, as well as those of the wax, i. e., the wetting and super-cooling characteristics, are not materially altered or impaired by the vinyl resin, and that the inherent tackiness of the rubber at normal temperatures and the fluidity of the wax and the consequent low film strength at elevated temperatures are sufficiently altered by the vinyl resin to overcome the difficulties attributable to these characteristics in compositions of the aforesaid type.

The relative proportions of wax, rubber and vinyl resin may be varied throughout a wide range, but as a general rule more satisfactory results may be obtained if the dry rubber content is of the order of 10 to 40% of the wax, and the vinyl resin content is between 4 and 15% of the wax content, it being understood that these figures may be varied in accordance with the physical characteristics of the particular type of rubber, wax and vinyl resins selected for use. In any event the resulting composition, after application to the surface of a sheet material and elimination of the solvent or water as the case may be, consists essentially of the dispersion wherein the wax constitutes the continuous phase and the rubber and vinyl resin the dispersed phase. The resulting coating is characterized by a relatively lower softening point yet retention of viscosity and film strength at elevated temperatures than would be possible of attainment in compositions consisting essentially of paraffin-rubber or the equivalent mixtures, and at normal temperatures the strength and character of the film is such as effectively to resist blocking. Furthermore, when a composition prepared in accordance with the present invention is dispersed in a given solvent, the viscosity of the dispersion is substantially lower than that of a composition prepared in accordance with the prior art practice and having substantially the same total solids content. Moreover, as compared with prior art compositions possessing the same or similar degree of adhesion, we find that our composition contains substantially less rubber and hence has better aging qualities and greater resistance to blocking.

A further advantage of our composition is that it may be quickly compounded in any of the conventional types of mixing apparatus, and when compounded it may be readily applied at comparatively low temperatures without necessitating the use of expensive equipment.

The term "rubber" as used in the formulae described herein is intended to mean the crepe rubber and smoked sheets of commerce, derived from the latex and Hevea Braziliensis and also to include generally both natural and synthetic rubber or their equivalents, and also such naturally occurring materials as balata, gutta-percha, gutta-siak, gutta-kayak, gums such as pontianiak and guayule, and certain wild rubbers and rubber-like resins (in which case a larger quantity must be used in formulation than if crepe rubber, or smoked sheets is used, depending on the characteristics of the substitute rubber); the term "wax" is intended to include not only such materials as beeswax, paraffin, ceresin, spermaceti, carnauba and candelilla, but also their natural and synthetic equivalents, and mixtures thereof; and the term "vinyl resin" is intended to include such polymerized products as are derived from compounds having the general formula $CH_2=CR_1R_2$, wherein $R_1$ is hydrogen or a hydrocarbon residue, and $R_2$ is an hydroxyl, carboxyl, cyanogen, halogen, alkoxy, acetyl, halogenated acetyl residue, etc., and includes polycrylic acid, and polymethacrylic acid, or the esters, amides, nitrides, chlorides, or anhydrides of these acids, polyvinyl halides and acetate.

The particular compounding procedure will of course vary depending upon whether a non-aqueous or an aqueous dispersion is to be prepared. In preparing non-aqueous dispersions the three essential ingredients may be separately dissolved or dispersed in suitable solvents such as naphtha and/or benzol, and subsequently thoroughly mixed, after which the concentration of the resulting product may, if desired, be adjusted to produce the preferred total solids content for the most satisfactory application.

Specific examples illustrating the preparation of non-aqueous dispersions are as follows:

*Example 1*

20 pounds of paraffin wax, preferably having a melting point of about 140° F., are melted in a jacketed container and 2 pounds of rosin are added. The temperature required for melting the paraffin and rosin is about 150° F., and when these ingredients have been melted 40 pounds of naphtha and 20 pounds benzol may then be added, whereupon the temperature is lowered to approximately 105° F. and the solution is completed at this temperature. 5 pounds of pale crepe rubber are then added and the mixture thoroughly agitated to effect complete dissolution of the ingredients. In a separate container a second solution is prepared, consisting of 2 pounds of polymerized vinyl resin and 3 pounds of benzol. When both solutions are complete, the vinyl resin solution is added to the rubber-rosin-paraffin solution, and the resulting mass is thoroughly stirred to insure thorough dissolution and uniform mixing of the ingredients. After straining out foreign particles the resulting solution is ready for application to such sheet materials as paper, cloth, Cellophane, metal foil or the like, the application preferably being carried out at a temperature of the order of 105° F.

Although the above specified proportions are preferred, we find that the wax content may be varied between 15 and 40 pounds, that the rosin content may run as high as 30% of the wax, that the rubber content may vary from 10 to 40% of the wax, and that the vinyl resin content may vary from 10 to 30% of the wax.

A composition prepared in the manner above described has a relatively high viscosity so that undue penetration of the stock is not encountered, and yet adequate adhesion to the sheet material is obtained. Upon being spread upon the sheet material in a relatively thin film, the greater part of the solvent is rapidly evaporated when it passes into a heated zone, and hence the resulting film quickly forms or sets to a solid or gelled condition. The film when cooled to normal temperature is free from tackiness and has no tendency to block.

*Example 2*

Separate solutions or dispersions of the ingredients are prepared as follows:

(a) 5 parts of wax or the like ester of a higher fatty acid are blended with 6 parts of paraffin, preferably having a melting point of about 104° F., and the mixture dissolved in about 15 parts of benzol.

(b) 10 parts of balata and 1 part of crepe rubber, are dissolved in approximately 20 parts of benzol.

(c) 1 part of chlorinated regenerated or cyclized rubber is dissolved in 5 parts of benzol.

(d) 2 parts vinyl resin (preferably Vinylite A) are dissolved in 3 parts of benzol.

After having prepared the above solutions (b) and (c) are added to solution (a) with 30 parts of naphtha, after which (d) and 5 parts of alcohol are preferably added, the compounding being carried out in a jacketed kettle which may be heated to a temperature of about 105° F. Although the ranges above specified are preferred, we have found that satisfactory results may be obtained if the proportions of the ingredients fall within the following range:

| Ingredients | Range |
|---|---|
| Wax | 22-130 |
| Balata | 30-75 |
| Crepe rubber | 3-8 |
| Vinyl resin | 6-15 |
| Chlorinated rubber | 0-2 |

The amount of solvent may be varied to produce a total solids content from about 25% to 75%, depending upon the conditions under which the finished product is to be applied, and although benzol and naphtha constitute the preferred solvents, we have found that the addition of about 5% alcohol is beneficial. After having prepared the solution as above described, it may be drawn off, strained and transferred to a coating machine for application to various types of sheet material, including paper, Cellophane, cloth, metal foil and the like.

In preparing aqueous dispersions or emulsions it is necessary first to emulsify the wax and resins and to employ rubber latex or the like dispersions in place of dry rubber. An illustrative procedure is as follows:

*Example 3*

20 parts of paraffin, preferably having a melting point of about 140° F., are blended with 2 parts of rosin (grade H) and 22 parts of this mixture are emulsified with 100 parts of water and 6 parts of ammonium stearate soap, preferably prepared by reacting about 64 parts stearic acid with 20 parts concentrated ammonia. The resulting product is an aqueous wax-rosin emulsion in which the ammonium stearate soap acts as a stabilizer and emulsifying agent.

128 parts of the wax rosin emulsion, prepared as above-described, are mixed with 8 to 10 parts of 60% latex and 3 to 5 parts of vinyl resin emulsion (Acronol emulsion) containing about 50% solids. The resulting dispersion contains approximately 25% solids and may be applied to various types of sheet material in accordance with conventional practice.

So far as we know vinyl resin is unique in producing two highly beneficial results which would not be expected to flow from a single component, namely (1) less heating required to soften the gumming for application and (2) greater rigidity and strength at room temperatures.

A self-supporting sheet material may be made from the compounds described above by spreading on a surface to which the compound will not adhere, as for instance a highly polished metal drum, drying out the solvent and stripping the fiber and rolling up.

It should be understood that the present disclosure is for the purpose of illustration only and that this invention includes all modifications and equivalents which fall within the scope of the appended claims.

We claim:

1. Sheet material having a thermoplastic coating comprising 15 to 40 parts of wax, from 2 to 12 parts vinyl resin, and from 2 to 16 parts rubber.

2. Sheet material having a thermoplastic coating comprising approximately 20 parts paraffin, 2 parts rosin, 5 parts rubber and 2 parts vinyl resin.

3. Sheet material having a thermoplastic coating comprising from 22 to 130 parts wax, from 30 to 80 parts rubber, from 6 to 15 parts vinyl resin, and not more than 2 parts chlorinated rubber.

4. Sheet material having a thermoplastic coating comprising approximately 60 parts rubber, 45 parts wax, 11 parts vinyl resin and 0.5 part of chlorinated rubber.

5. Sheet material having a thermoplastic coating comprising 20 parts paraffin wax, 2 parts rosin, 5 parts rubber and 2 parts vinyl resin.

ERNEST L. KALLANDER.
BENJAMIN ASNES.